UNITED STATES PATENT OFFICE.

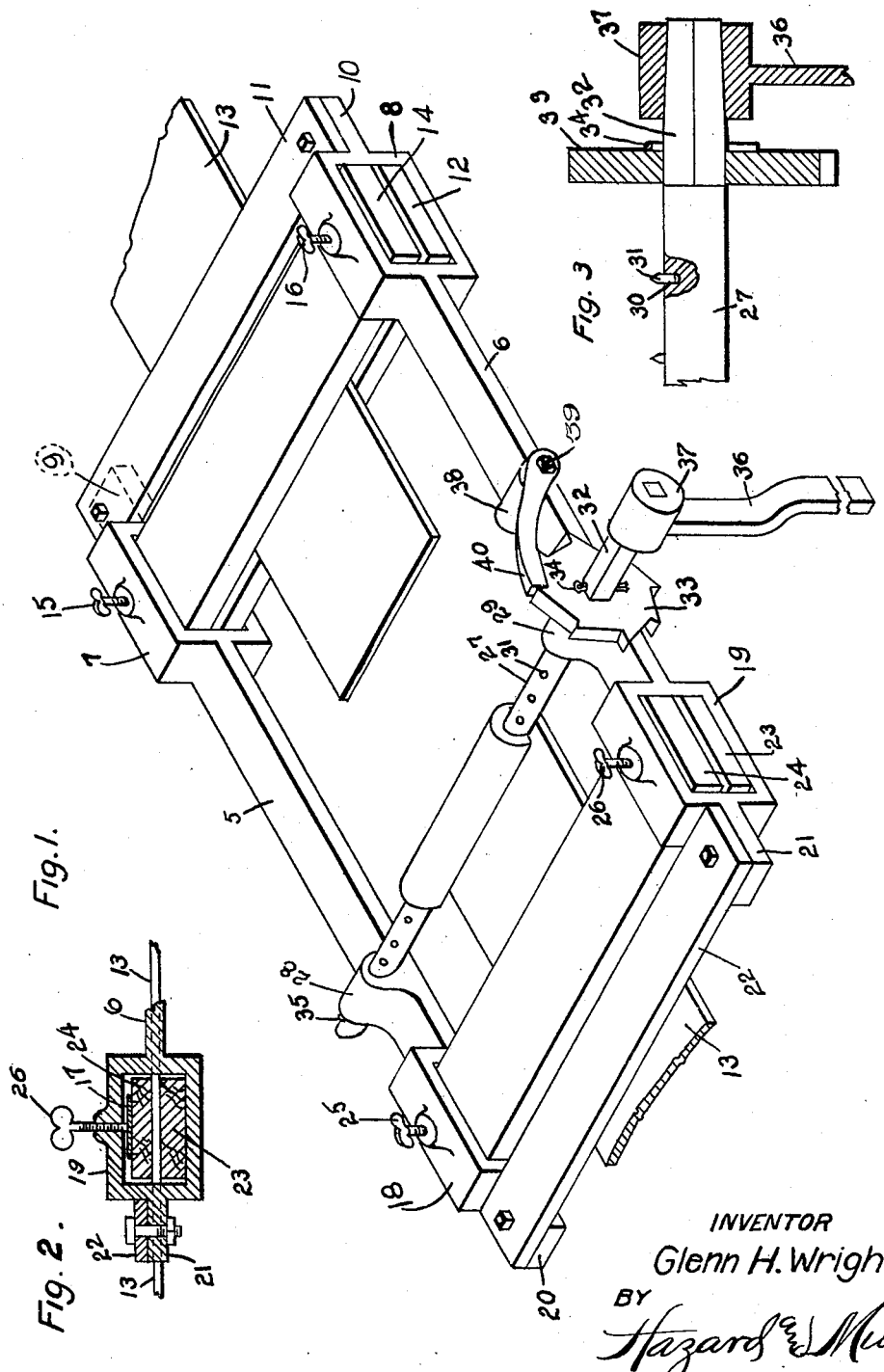

GLENN H. WRIGHT, OF UPLAND, CALIFORNIA.

BELT-STRETCHER.

1,324,575.　　　　　Specification of Letters Patent.　　Patented Dec. 9, 1919.

Application filed January 31, 1919. Serial No. 274,338.

*To all whom it may concern:*

Be it known that I, GLENN H. WRIGHT, a citizen of the United States, residing at Upland, in the county of San Bernardino and State of California, have invented new and useful Improvements in Belt-Stretchers, of which the following is a specification.

My invention relates to belt stretchers and consists of the novel features herein shown, described and claimed.

My object is to make a belt stretcher which may be readily applied to a belt with the belt upon the pulleys upon which it is to run, and tighten the belt to the desired extent and to splice the belt, and then remove the belt stretcher.

Figure 1 is a perspective of a belt stretcher embodying the principles of my invention in use.

Fig. 2 is a vertical cross section through one of the clamps.

Fig. 3 is a fragmentary detail upon an enlarged scale of the stretcher shaft.

The side bars 5 and 6 are substantially mates. A rectangular housing 7 is formed upon the rear end of the bar 5, and a similar rectangular housing 8 is formed upon the rear end of the bar 6, said housings 7 and 8 being in transverse alinement. An ear 9 extends backwardly from the housing 7 and an ear 10 extends backwardly from the housing 8. A cross bar 11 is bolted to the ears 9 and 10 to connect the side bars 5 and 6 rigidly together at one end. A clamping bar 12 is placed with its ends in the housings 7 and 8 so that the free end of a belt 13 will pass over the clamping bar 12. A second clamping bar 14 fits in the housings 7 and 8 on top of the belt 13, and clamping screws 15 and 16 are screw seated downwardly through the housings 7 and 8 to press the clamping bar 14 downwardly upon the belt 13 and clamp the belt between the bars 14 and 12, so as to hold that end of the belt during the stretching operation. The clamping bars 12 and 14 may be made of wood, and then pressure plates 17 should be placed under the clamping screws 15 and 16 so that the screws will not penetrate the wood.

In a like manner a housing 18 is formed upon the forward end of the side bar 5, and a housing 19 is formed upon the forward end of the side bar 6 in transverse alinement with the housing 18. An ear 20 extends forwardly from the housing 18 and a similar ear 21 extends forwardly from the housing 19. A cross bar 22 is bolted to the ears 20 and 21 to rigidly connect the forward ends of the side bars together. A clamping bar 23 is placed in the housings 18 and 19 so that the other free end of the belt 13 will pass over the clamping bar 23. A clamping bar 24 fits in the housings 18 and 19 upon the belt 13 and clamping screws 25 and 26 are inserted downwardly through the housings 18 and 19 to press the clamping bar 24 against the belt 13 to clamp the belt between the bars 24 and 23.

A stretcher shaft 27 is rotatably mounted in bearings 28 and 29 extending upwardly from the side bars 5 and 6 a short distance behind the housings 18 and 19. Small openings 30 are drilled into the shaft 27 and sharpened pins are driven into these openings to make a row of teeth 31 so that when the end of the belt is passed under the shaft and wrapped upwardly around the shaft 27 and pressed down upon the teeth 31 the teeth 31 will penetrate the belt and hold the belt from slipping upon the shaft, so that when the shaft is rotated the belt will be wound upon the shaft.

An extension 32 of the shaft 27 is squared outside of the bearing 29. A ratchet wheel 33 is placed upon this squared extension against the bearing 29, and a cotter 34 is inserted through the shaft 27 outside of the ratchet wheel 33. A cotter 35 is inserted through the shaft 27 outside of the bearing 28 so as to hold the shaft from endwise motion.

A lever handle 36 has a wrench head 37 fitting upon the extreme outer end of the squared extension 32 so that the shaft 27 may be rotated by operating the lever handle 36. The wrench head 37 preferably fits so that it may be easily removed because it will frequently happen that the handle 36 cannot be swung entirely around but may be moved to a quarter turn or thereabout and then removed and moved back and reapplied to the shaft.

A bearing 38 extends upwardly from the side bar 6 a short distance back of the bearing 29, and a pivot pin 39 is fixed in this bearing 38. A pawl 40 is mounted on the pin 39 to engage the ratchet wheel 33.

In the practical operation one end of the belt 13 will be passed between the clamping bars 14 and 12 and the clamping screws 15 and 16 operated to clamp the belt and hold it during the stretching operation. Then the belt will be passed around the pulleys on which the belt is to run and the other end of the belt will be passed between the clamping bars 24 and 23 and under the shaft 27 and will be wrapped around the shaft and pressed down upon the teeth 31. Then the lever handle 36 will be operated to wind the belt upon the shaft 27 until the belt has been drawn to the proper tightness. Then the clamping screws 25 and 26 will be operated to grip the belt firmly between the clamping bars 24 and 23. Then the pawl 40 will be raised, the shaft 27 operated to unwind the belt from the shaft 27 and the unwound portion will be laid upon and overlap the other end of the belt. The belt will be cut to the proper length and fasteners driven downwardly to splice the belt.

Thus I have produced a portable belt stretcher for use in splicing a belt while the belt is in place upon the pulleys upon which the belt is to run. After the belt is spliced the belt stretcher may be removed from the spliced belt by removing the clamping bars 12 and 23 from the housings.

The cross bars 11 and 22 are above the spliced belt and the clamping bars 14 and 24 and the shaft 27 are above the spliced belt so that the belt stretcher may be removed upwardly away from the belt.

Various changes may be made without departing from the spirit of my invention as claimed.

I claim:

1. A belt stretcher comprising two side bars; a toothed stretcher shaft mounted crosswise in the side bars; means connected to the side bars for clamping one end of the belt at one side of the shaft; means connected to the side bars for clamping the other end of the belt at the other side of the shaft; and means for operating the shaft to wind up and stretch the belt.

2. A belt stretcher comprising side bars; a toothed stretcher shaft mounted crosswise in the side bars; clamping means mounted in the side bars at one side of the shaft; and a second clamping means mounted in the side bars at the other side of the shaft; so that the belt may be placed around the pulleys on which it is to run, one end of the belt clamped to the belt stretcher and the other end passed through the second clamp and wound upon the shaft to tighten the belt and then the second clamp operated to grip the belt so that the belt may be unwound from the shaft and cut and spliced.

3. A belt stretcher comprising side bars; a toothed shaft rotatably mounted crosswise in the side bars; means connected to the side bars at one side of the shaft for clamping a belt, and means connected to the side bars at the other side of the shaft for clamping the belt; and means for operating the toothed shaft to wind the belt upon the shaft.

In testimony whereof I have signed my name to this specification.

GLENN H. WRIGHT.